(12) United States Patent
Britton et al.

(10) Patent No.: US 6,697,326 B1
(45) Date of Patent: Feb. 24, 2004

(54) METHOD AND APPARATUS FOR GENERATING REPLIES TO ADDRESS RESOLUTION PROTOCOL REQUESTS

(75) Inventors: Edward Glen Britton, Chapel Hill, NC (US); Michael G. Fitzpatrick, Raleigh, NC (US); Jeffrey Douglas Haggar, Holly Springs, NC (US); Maurice Isrel, Jr., Raleigh, NC (US); Barton Clark Vashaw, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,945

(22) Filed: Apr. 14, 2000

(51) Int. Cl.[7] .............................................. H04L 12/26
(52) U.S. Cl. ................... 370/218; 370/257; 370/395.54
(58) Field of Search ................................ 370/216, 389, 370/395.54, 475, 392, 400–401, 351, 254–255, 218, 257

(56) References Cited

U.S. PATENT DOCUMENTS 6,049,825 A * 4/2000 Yamamoto .................. 709/221
6,108,300 A * 8/2000 Coile et al. ................. 370/217
6,512,774 B1 * 1/2003 Vepa et al. .................. 370/401

* cited by examiner

*Primary Examiner*—Melvin Marcelo
(74) *Attorney, Agent, or Firm*—Jerry W. Herndon

(57) ABSTRACT

The invention ensures that a single and consistent reply is made to ARP request in a system of connected IP networks. In each host, the first adapter A to become active is designated as being in an arbitrary first physical network (PNET1). For each subsequent adapter B to become active on a host, the host sends a packet over one of the adapters (A) of each network already known to the host with a hop count of one. If the packet is received over adapter B, it is known that adapters A and B are in the same physical network. If this occurs, adapter B is marked as being in the same network PNET1 as adapter A. If the packet is not received over adapter B then B is in a different physical network as A. In this event, adapter B is marked as being in a new network PNET2. When adapter A becomes inactive, if there are other active adapters in the physical network to which A belongs, then one of the remaining adapters B in that physical network is designated to have the responsibility for replying to ARP requests for A. A gratuitous ARP advertisement is transmitted into the network mapping IP-A with MAC-B. When adapter A again becomes active, adapter A will re-assume ownership of ARP replies for IP address A.

16 Claims, 9 Drawing Sheets

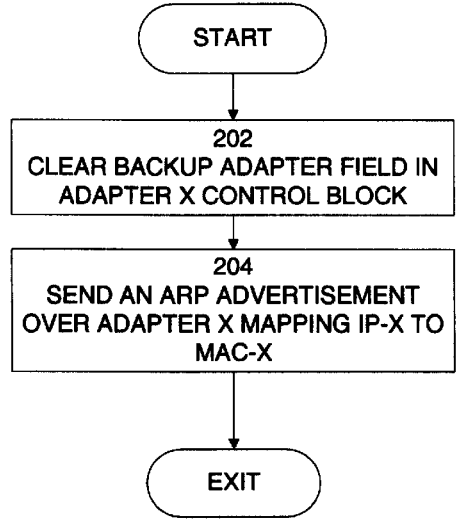
FIG. 2 - FIRST EMBODIMENT.
ACTIVATION OF ADAPTER X.
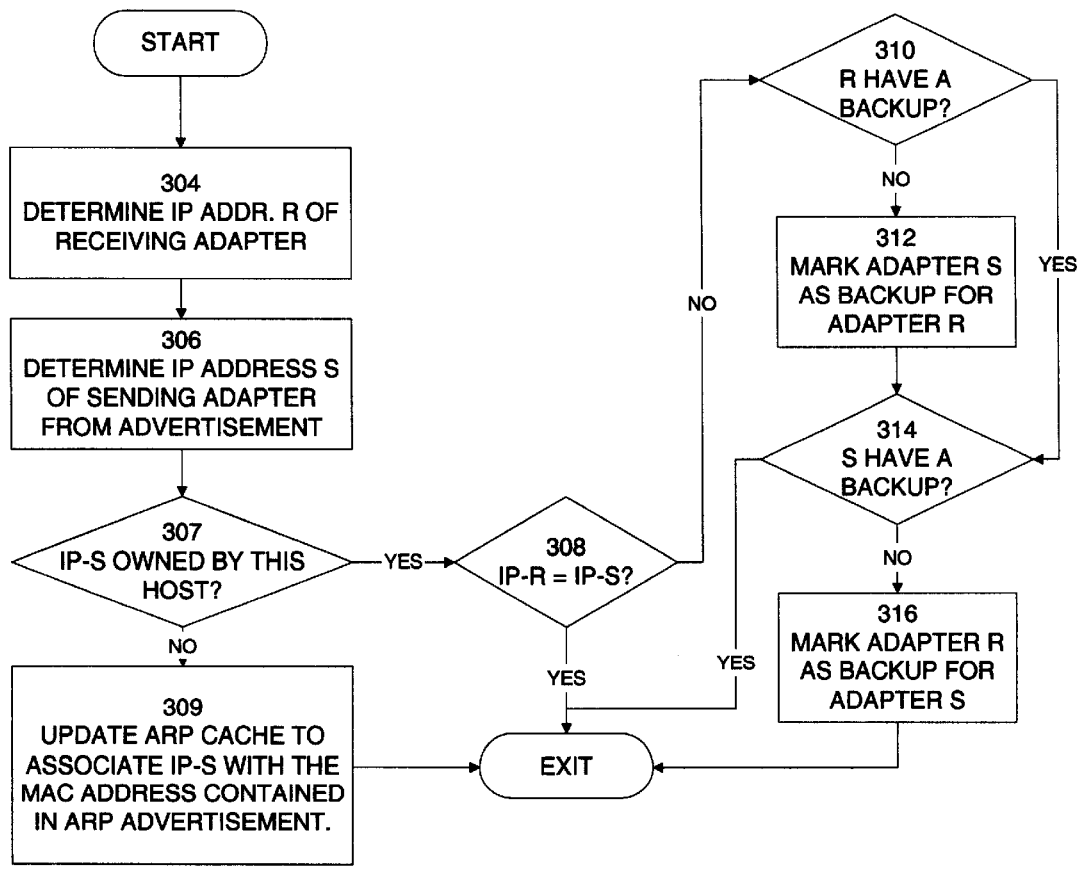
FIG. 3 - HOST HANDLES ARP PROCESSING.
HOST RECEIVES AN ARP ADVERTISEMENT.

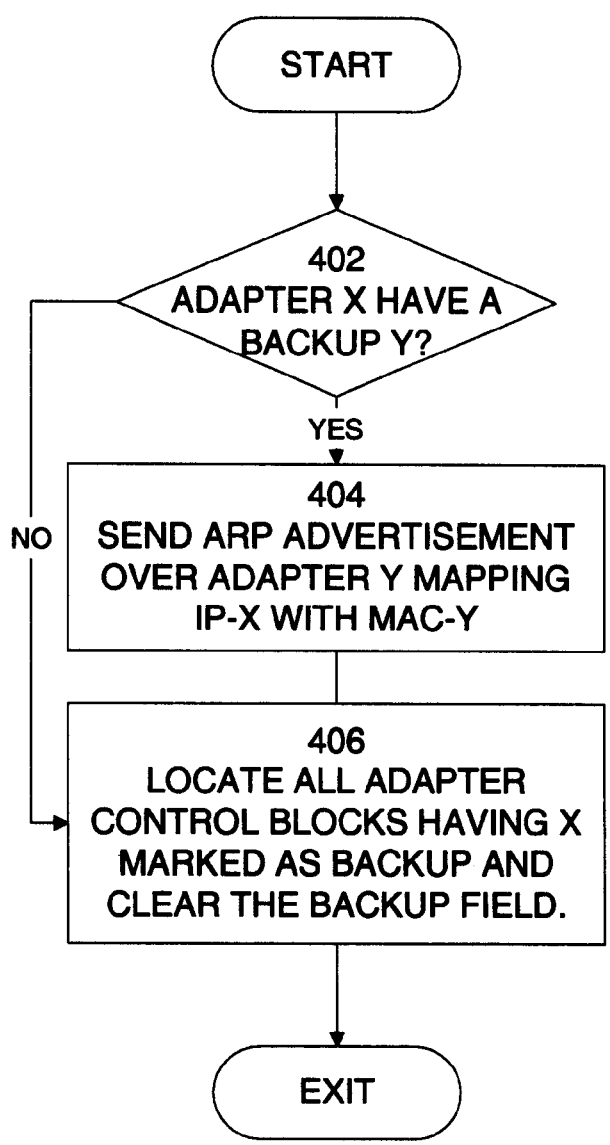
FIG. 4 - FIRST EMBODIMENT.
ADAPTER X BECOMES INACTIVE.

FIG.5 - FIRST EMBODIMENT.
HOST RECEIVES ARP REQ. FOR IP-A OVER ADAPTER B.
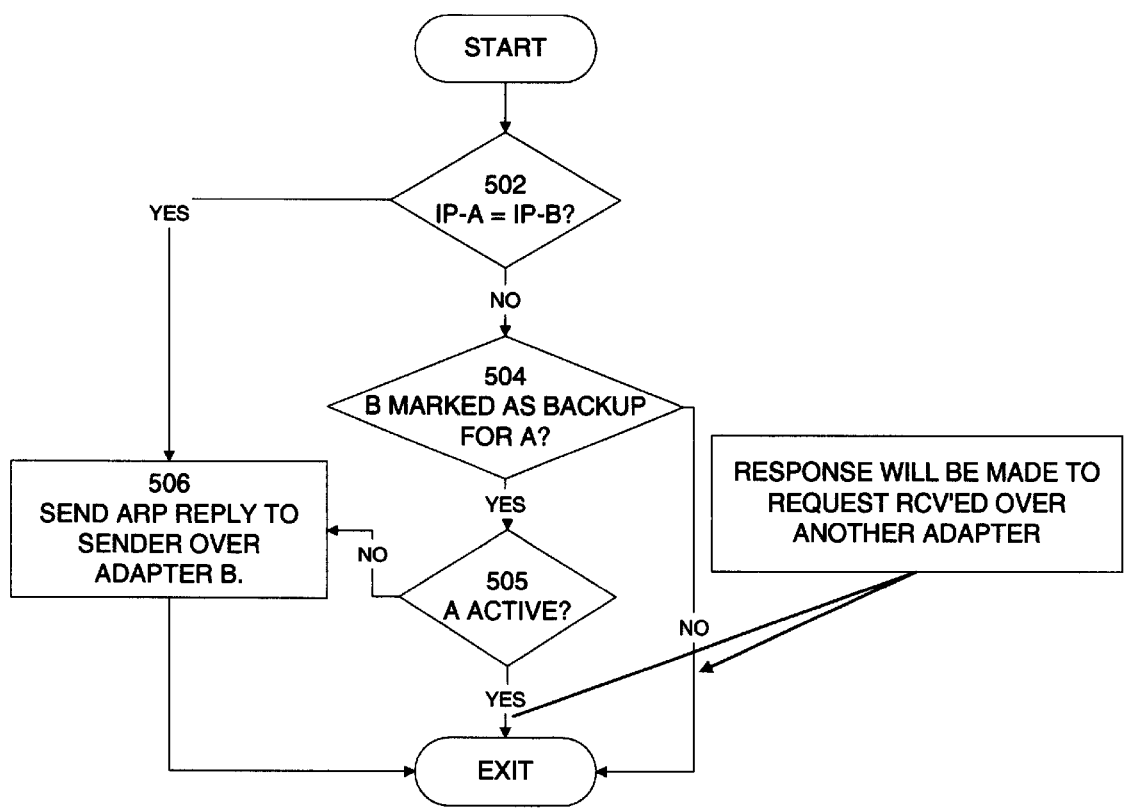
FIG.6 - FIRST EMBODIMENT.
ARP REQUESTOR RECEIVES REPLY TO ARP REQUEST FOR IP-A
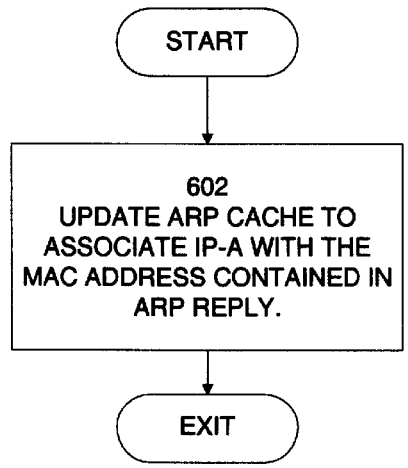

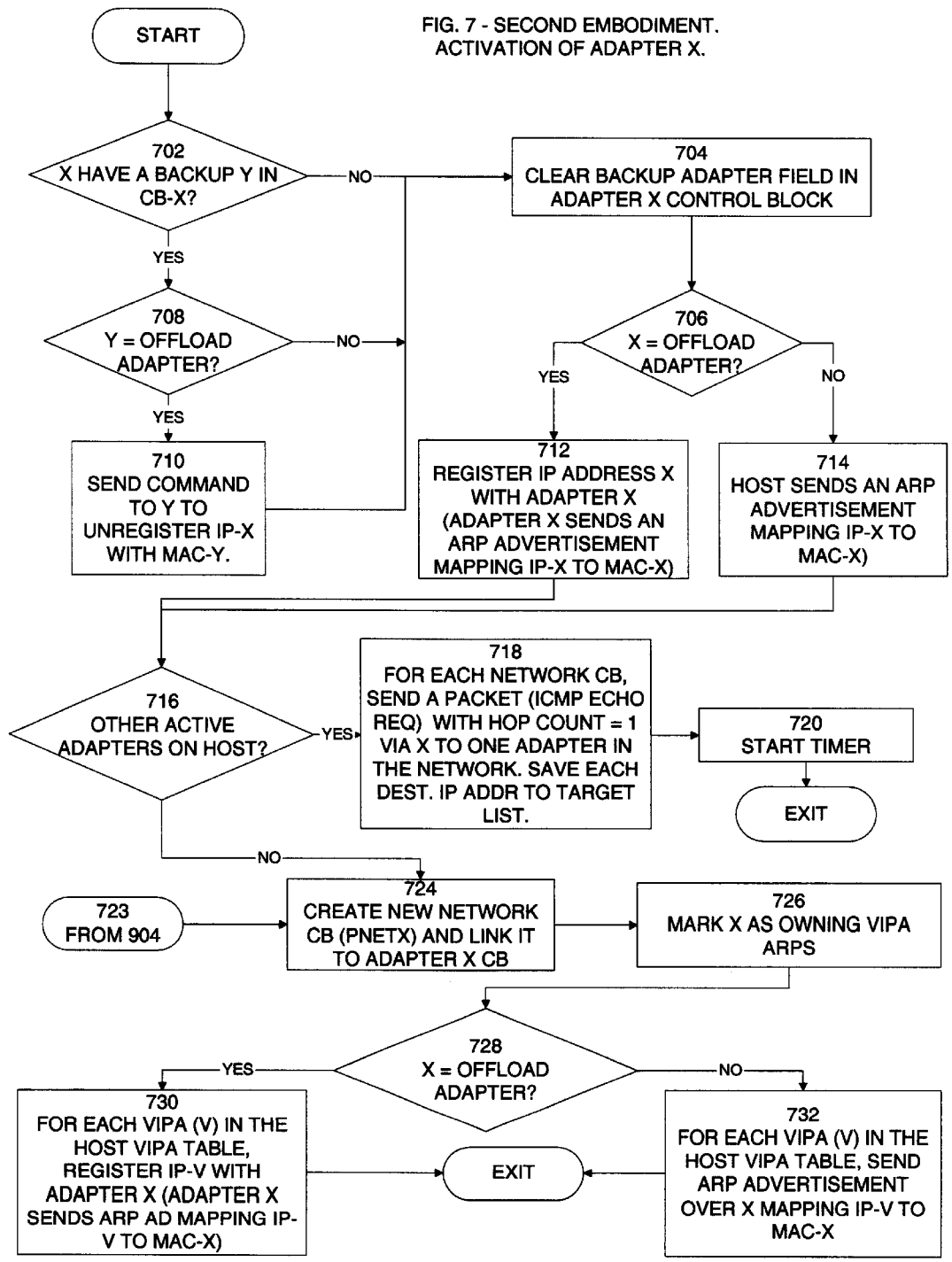

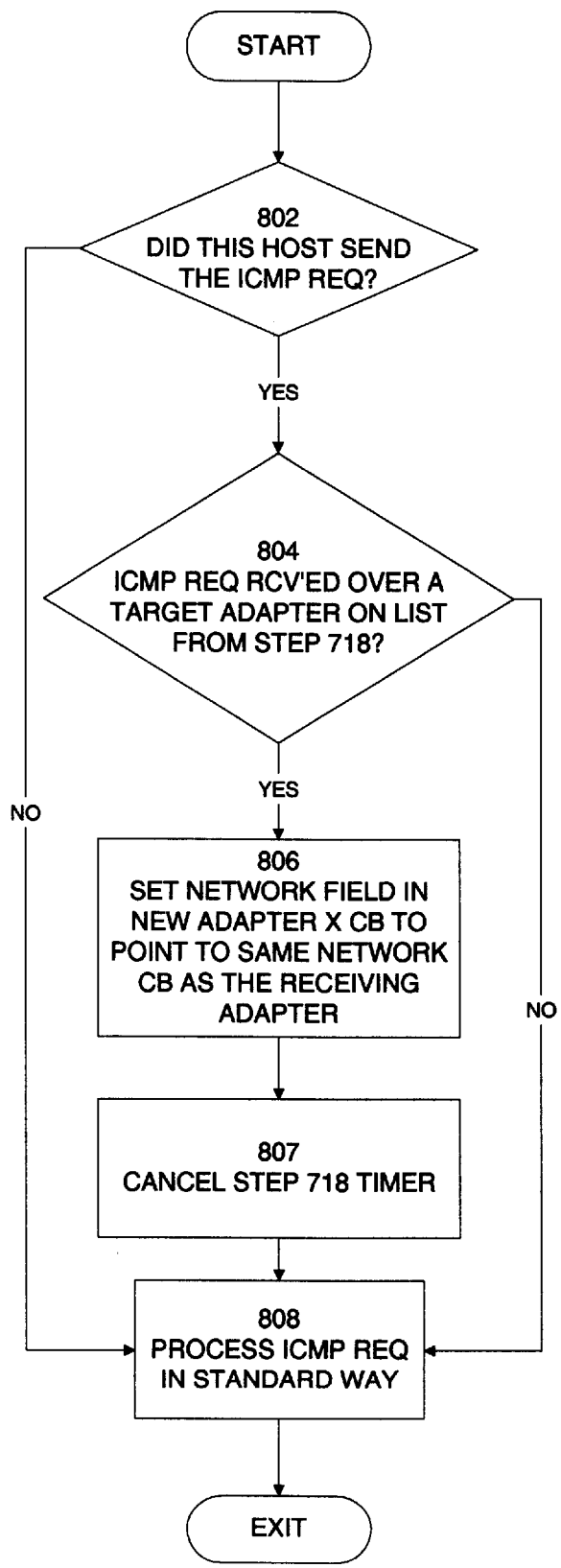
FIG. 8 - SECOND EMBODIMENT.
HOST RECEIVES ICMP ECHO REQUEST.

FIG. 9 - SECOND EMBODIMENT.
STEP 720 TIMER TIMEOUT.
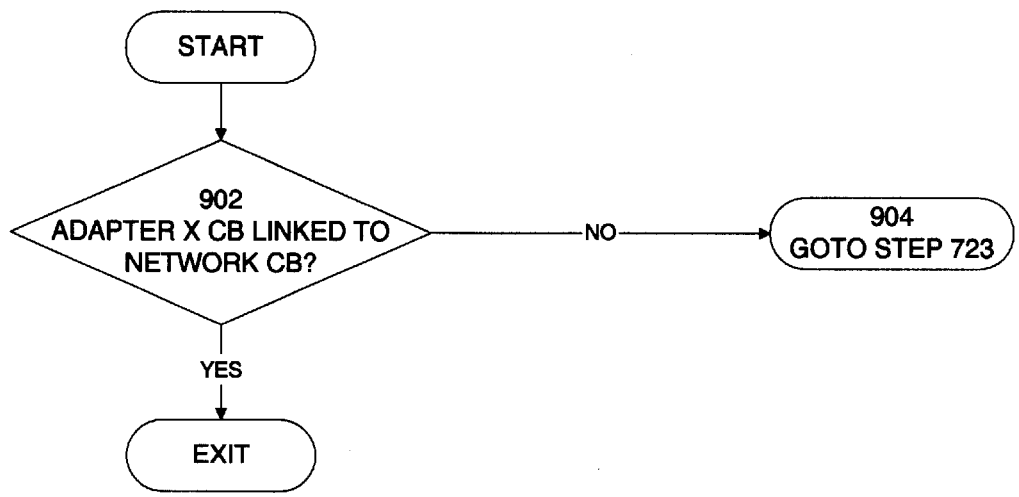
FIG. 10 - SECOND EMBODIMENT.
OFFLOAD ADAPTER B RECEIVES ARP REQUEST FOR IP-A
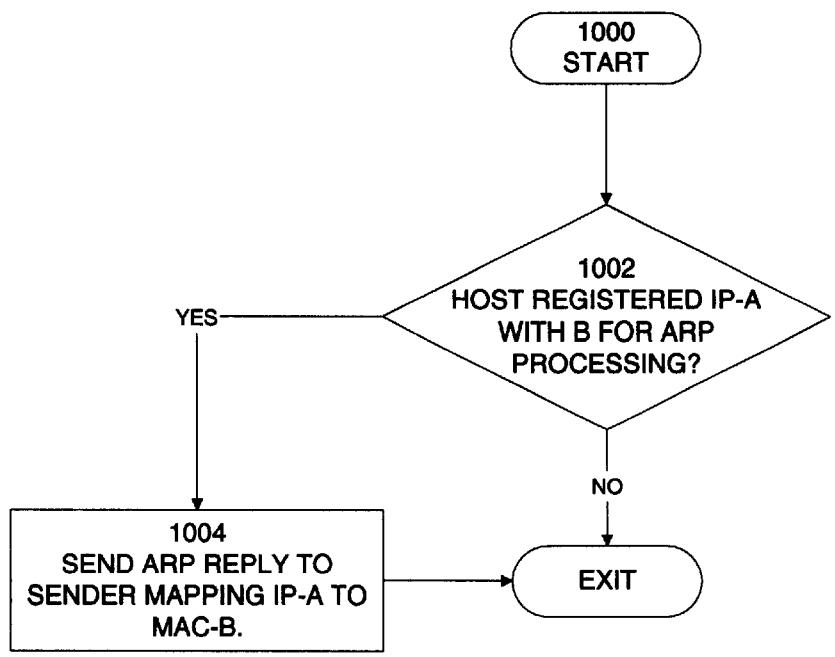

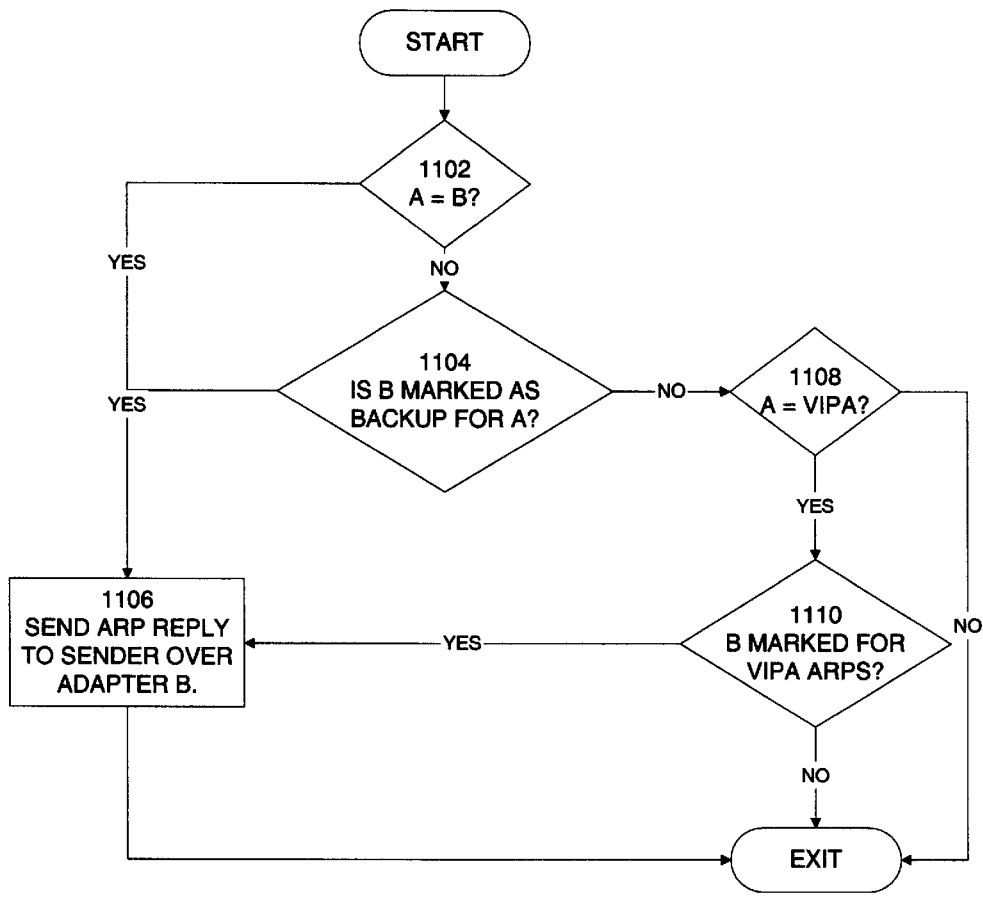
FIG.11 - SECOND EMBODIMENT.
HOST RECEIVES ARP REQ. FOR IP-A OVER ADAPTER B.
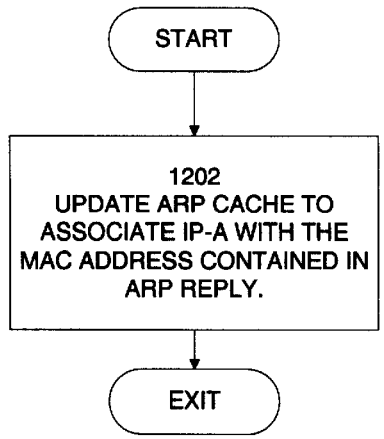
FIG.12 - SECOND EMBODIMENT.
ARP REQUESTOR RECEIVES REPLY TO ARP REQUEST FOR IP-A
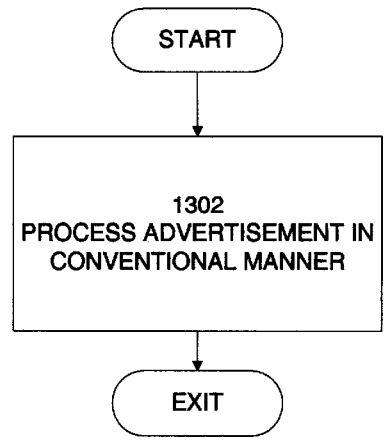
FIG. 13 - SECOND EMBODIMENT.
HOST RECEIVES AN ARP ADVERTISEMENT.

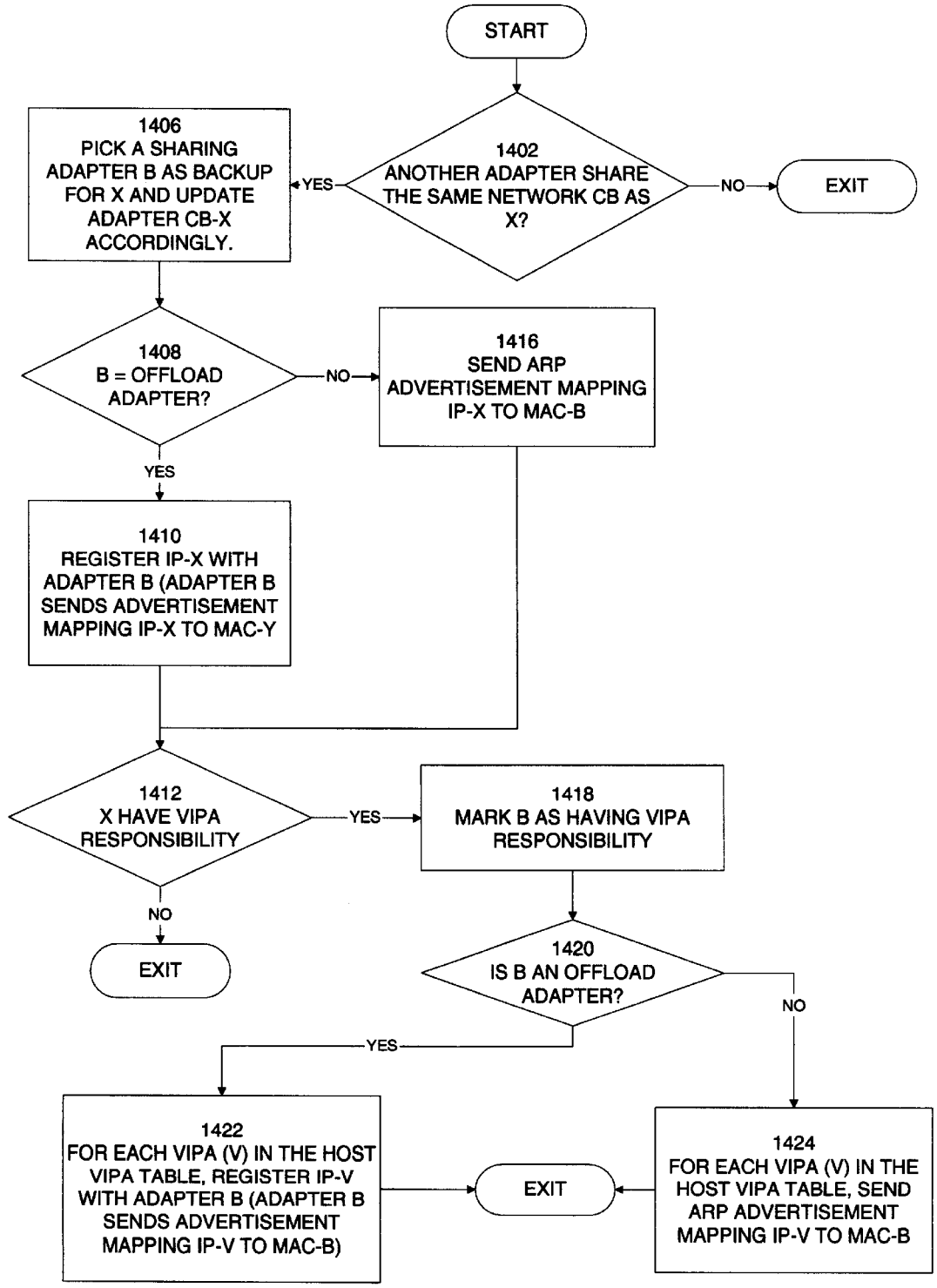

METHOD AND APPARATUS FOR GENERATING REPLIES TO ADDRESS RESOLUTION PROTOCOL REQUESTS

TECHNICAL FIELD

The invention relates generally to the field of networking. More specifically, it relates to the use of the Address Resolution Protocol (ARP) and to ensuring that only a single and consistent reply is generated in response to each ARP request.

BACKGROUND

The Address Resolution Protocol (ARP), used in TCP/IP networks such as the Internet, provides to requesting hosts a mapping between an IP address and a media access control (MAC) address. A host which needs to learn the MAC address for a given IP address broadcasts an ARP request containing the IP address to all routers and hosts in a network. The requests are received by adapters at the hosts; it is an adapter that owns an IP address and a corresponding MAC address. The requesting host learns the MAC address corresponding to an IP address by virtue of an ARP reply to an ARP request. An ARP reply is sent from the host that owns the corresponding adapter or, in some cases, an adapter is arranged to perform ARP processing and it responds to, ARP requests instead of the host. Such an adapter is called an offload adapter. In the remainder of this specification, host will be used to refer to both hosts that perform some kind of data processing in the traditional sense and to routers that route messages between networks or to nodes that perform both functions.

A host that owns multiple IP addresses that receives an ARP request will reply to the request only if the IP address in the request is the IP address of the adapter or if the adapter is explicitly configured to reply for the requested IP address.

A "real" IP address is one that is associated with a physical adapter. An adapter often supports thousands of network sessions with other hosts. If the adapter fails, all of the active sessions using the IP address associated with the adapter will also fail. Virtual IP addresses (VIPAS) were conceived to mitigate this problem. A VIPA is an IP address that is associated with a host, rather than with a physical adapter. Messages can be addressed to real IP addresses or to VIPAs. If a host contains multiple adapters, IP traffic addressed to a VIPA can be routed through any of the adapters. In this way, a host can provide fault tolerance after an adapter failure by routing the VIPA traffic over a different physical adapter. Virtual IP addressing is described in detail in U.S. pat. No. 5,923,854, the contents of which are incorporated by reference herein.

There are two types of physical adapters, a host adapter in which the host does all of the ARP request processing for the adapter and an offload adapter that does its own ARP request processing.

For ease of expression, in the remainder of this document letters such as A, B, C, X, etc. other than V designate physical adapters. The letter V denotes a virtual IP address. IP-A represents the IP address of adapter A; MAC-A represents the MAC address of the adapter A associated with IP-A. IP-V denotes the virtual IP address V. VIPA and IP-V actually refer to the same thing an IP address assigned to a host. Both of these designations are used interchangeably in this specification.

The traditional approach of ARP processing has a number of deficiencies. If adapters A and B are on the same physical network (i.e., all adapters on the network receive all ARP requests that any one of them receives) and both are owned by the same host, the host will not reply to ARP requests for IP-A received over adapter B. The host expects to reply to the request received over adapter A. This is a simple and effective way of preventing the generation of multiple replies to a single ARP request. However, it also means that no ARP reply will be generated if adapter A fails or is inactive. This means that adapters cannot serve as backups for one another. If a host owns IP-V and an ARP request for the MAC address assigned to IP-V arrives on adapter A, the host will not reply to the request, unless the owner has explicitly configured the system to do so. In the latter VIPA situation, if adapters A and B are on the same physical network, and A is assigned to IP-V, (explicitly configured to perform proxy ARP for IP address V), and adapter A fails, the host will no longer reply to ARP requests for V, even though it could send an ARP reply for V via adapter B. This often results in unsuccessful ARP requests.

The problem of providing backup adapters for offload adapters is even more difficult. For offload adapters, the host owning the offload adapter never sees an ARP request received over the offload adapter and the host likely has no knowledge of the MAC address of the offload adapter. If the offload adapter only replies to ARP requests containing its IP address, then it cannot provide any backup support for other adapters.

To address these limitations, a host could reply to any ARP request it receives over any adapter for any IP address owned by the host. However, when multiple adapters are on the same physical network, this will result in the host sending multiple ARP replies to a single ARP request and each will contain a different MAC address. This results in a flip-flopping of MAC addresses in the network for a single IP address. This, in turn, causes serious problems for network monitoring software. This flop-flopping of MAC addresses can also lead to odd traffic behavior and performance degradation.

To prevent multiple ARP replies when offload adapters are not involved, a host might implement a mechanism such that when the host first receives an ARP request over adapter A, it saves a timestamp and replies to the request. If within a short time it receives the same ARP request over adapter B, the host knows that an ARP response has recently been sent; so it ignores the ARP. Communication software in the Berkley Software Distribution uses this approach. A host might also implement such a technique to prevent multiple ARP replies for VIPAs. However, this timestamping solution still produces a flip-flopping of MAC addresses in a network. This is because there is a race as to which adapter A or B first receives an ARP request.

Therefore, there is a need for a solution that provides exactly one ARP reply with a consistent MAC address for any ARP request in an environment in which a host uses multiple adapters to address the same physical network, without the need for any user configuration.

SUMMARY OF THE INVENTION

Two embodiments are disclosed. The first embodiment is applicable to networks that do not contain VIPAs and offload adapters. The second implementation allows both types of physical adapters (host and offload) and VIPAs to coexist.

The First Embodiment

When an adapter (A) becomes active, the owning host sends an ARP advertisement into the network over adapter A that associates the MAC address for adapter A (MAC-A) with an IP address (IP-A). This advertisement is received by all hosts in the network and they update their ARP cache table to map IP-A to MAC-A accordingly. If the advertisement is also received at the sending host over a different adapter B, then the host knows that adapter B is on in the same physical network as adapter A. Therefore, B can be designated as a backup adapter for A and A can be designated as backup adapter for B. The host maintains a backup adapter field for each adapter owned by the host where this information is maintained. When the host discovers that adapter B is in the same network as adapter A, it queries the backup adapter field. If no backup adapter has been designated for A, then the host sets B as the backup adapter for A. Likewise, the host queries the backup adapter field for adapter B and sets A as the backup adapter for B if no backup adapter has already been designated.

If adapter A fails or becomes inactive, the host resets the backup adapter field for any adapter it owns for which A is marked as the backup adapter. If a backup adapter B has been designated for A, the owning host also sends an ARP advertisement associating MAC-B with IP-A. This advertisement causes each host in the network to update their ARP cache table to map IP-A to MAC-B. This allows network connections to IP-A originally served via adapter A to continue non-disruptively over adapter B and it also provides access to the host for subsequent new connections. Whenever the host receives an ARP request for IP-A on adapter B, the host replies to the request with MAC-B.

When adapter A later becomes active, the host sends a gratuitous ARP advertisement that maps IP-A to MAC-A. This allows adapter A to re-assume responsibility for responding to ARP requests for IP-A.

The Second Embodiment

The first embodiment depends on the host receiving ARP requests to determine what networks its adapters are on. Therefore, it does not function properly in networks that include offload adapters, because it does not receive ARP requests for these adapters. The adapters handle the ARP processing.

To solve the problems for offload adapters, the invention uses a different technique to determine what adapters of a host are on the same networks. This technique also works for host adapters and is further arranged to accommodate VIPAs as well. In each host, the first adapter A to become active is designated as being in a first physical network (PNET1). The identification assigned to the network is arbitrary. It is only necessary to differentiate each separate network for the benefit of the host. For each subsequent adapter B to become active on a host, the host sends a packet over one of the adapters of each network already known to the host with a hop count of one. In the case of the second adapter to become active, the packet would be sent over adapter A. In the preferred embodiment the packet is an ICMP (Internet Control Message Protocol) echo request, although it could be any type of packet that allows a hop count of one. The hop count of one ensures that the packet will not be forwarded off of the network by a network router. The packet will be received by adapter B only if A and B are in the same physical network on which it is sent. Therefore, if the packet is received over adapter B, it is known that adapters A and B are in the same physical network. If this occurs, adapter B is marked as being in the same network PNET1 as adapter A. If the packet is not received over adapter B, as evidenced by an eventual timeout function, then it is known that adapter B is in a different physical network as A. In this event, adapter B is marked as being in a new network PNET2. In general, the algorithm to determine in which network each offload adapter resides can be stated as follows. When an adapter becomes active at a host, send a data packet with a hop count of one over one adapter that resides in each different physical network known by the host and, if the packet returns on a different adapter, add the newly active adapter to the same physical network to which the receiving adapter belongs. If the packet does not return on a different adapter, create a new physical network at the host and add the new adapter to that network. If the new adapter also happens to be an offload adapter, then the host registers the IP address in the adapter. This causes the adapter to associate the IP address with the adapter MAC address known to the adapter and also to transmit an ARP advertisement into the network. If the new adapter is a host adapter, the host sends the advertisement itself. To handle VIPAs, after the first adapter on a host becomes active, it is initially marked as owning ARP responsibility for all virtual IP addresses owned by the host for the physical network in which the adapter is located.

When an adapter A becomes inactive in the second embodiment, if there are other active adapters in the physical network to which A belongs, then one of the remaining adapters B in that physical network is designated to have the responsibility for replying to ARP requests for IP-A. If B is a host adapter, the host sends a gratuitous ARP advertisement request mapping IP-A with MAC-B. If B is an offload adapter, the host registers IP-A in adapter B. This causes adapter B to associate its MAC address MAC-B with IP-A; the offload adapter also sends the gratuitous ARP advertisement. In either case, other network hosts update their ARP caches so that connections to IP-A will continue non-disruptively over adapter B. The host next determines if adapter A is marked as owning responsibility for VIPAs. If it is, then that marking is removed and adapter B is marked as owning VIPA ARP responsibility for that physical network. If B is a host adapter, then for each VIPA known to the host, it sends a gratuitous ARP advertisement into the network associating IP-V with MAC-B. If B is an offload adapter, the host registers IP-V with the adapter for each known VIPA and the adapter sends the advertisements into the network. Thereafter, when the host or an offload adapter on the host receives an ARP request for A or V, the host or offload adapter replies to it with the MAC address of B. When adapter A again becomes active, adapter A will re-assume ownership of ARP replies for IP address A.

The claims of this application are directed to the second embodiment wherein only host adapters are considered.

BRIEF DESCRIPTION OF THE DRAWING

In the Drawing,

FIG. 2 pertains to the first embodiment and shows the steps executed by a host when an adapter becomes active at the host;

FIG. 3 pertains to the first embodiment and shows the steps executed by a host when it receives an ARP advertisement message;

FIG. 4 pertains to the first embodiment and shows the steps executed by a host when an adapter becomes inactive;

FIG. 5 pertains to the first embodiment and shows the steps executed by a host when it receives an ARP request for the MAC address of an adapter associated with an IP address;

FIG. 6 pertains to the first embodiment and shows the steps executed by a host when it receives a reply to an ARP request it sent;

FIG. 7 pertains to the second embodiment and shows the steps executed by a host when an adapter becomes active at the host;

FIG. 8 pertains to the second embodiment and shows the steps executed by a host when it receives an ICMP echo request;

FIG. 9 pertains to the second embodiment and shows the steps executed by a host when a timeout occurs at a host after the host sends an ICMP echo request in an attempt to determine in what network a newly active adapter belongs;

FIG. 10 pertains to the second embodiment and shows the steps executed by an offload adapter when the adapter receives an ARP request for the MAC address associated with an IP address;

FIG. 11 pertains to the second embodiment and shows the steps executed by a host when it receives an ARP request over-adapter B for the MAC address associated with IP-A;

FIG. 12 pertains to the second embodiment and shows the steps executed by a host it receives a reply to an ARP request;

FIG. 13 pertains to the second embodiment and shows the steps executed by a host when it receives an ARP advertisement;

FIG. 14 pertains to the second embodiment and shows the steps executed by a host when an adapter becomes inactive.

DETAILED DESCRIPTION

Figure 1:
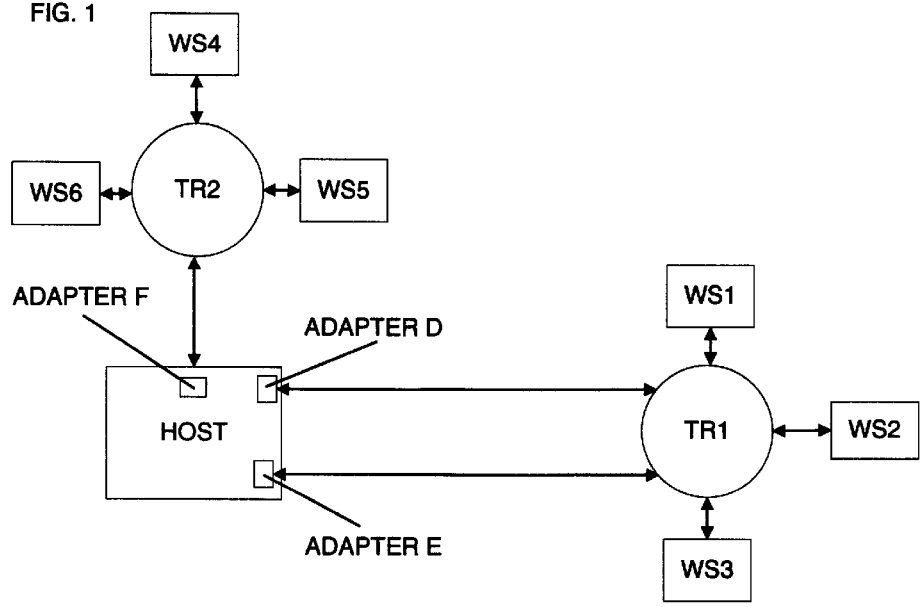
FIG. 1 is used to explain the problems and solutions of the invention; the Fig. shows a block diagram of a host containing three adapters, two of which are connected to first network and the third being connected to a different network.

FIG. 1 shows a block diagram of a host containing three adapters, two of which are connected to first network and the third being connected to a different network. This Fig. illustrates the problems associated with ARP processing and helps explain the invention. The host shown in the Fig. contains three adapters D, E and F. Adapters D and E are attached to the same network, which in the Fig. is illustratively assumed to be a token ring LAN TR1. TR1 has attached to it workstations WS1, WS2 and WS3. Adapter F is attached to a different network identified as token ring LAN TR2. TR2 has attached to it workstations WS4, WS5 and WS6. In conventional ARP processing, although adapters D and E are on the same network, if D fails or becomes inactive for any reason, the host (or adapter E if it is an offload adapter) will not respond to ARP requests for D received over adapter E. This prevents E from being a backup for D, and vice versa. If the host did respond to such ARP requests for D, then without additional processing ARP replies would be generated for both adapters D and E in the normal situation, thereby resulting in multiple and inconsistent ARP replies. Assume further that the host of FIG. 1 has one or more virtual IP addresses (VIPAs) V assigned to it and that D has responsibility for responding to ARP requests for VIPAs. In this case, for the same reason as above, if D fails or becomes inactive, the host will not respond to ARP requests for V received over E.

Therefore, the invention is directed to solving the problem of providing backup adapters when two or more adapters on the same network, and to do it in a way that results in one and only one reply to an ARP request. Further, the invention is adapted to solve this problem for host adapters, offload adapters and VIPAs.

The First Embodiment

FIG. 2 pertains to the first embodiment in which a system contains only host adapters and specifically to the steps executed by a host when an adapter X becomes active at the host. The first embodiment relies on the receipt of ARP advertisement messages to determine the network that adapters are on. The adapter control block maintained in memory for each adapter is modified to contain a backup adapter field. This field is cleared by step 202 for the adapter X which is becoming active. Next, step 204 sends an ARP advertisement over the new adapter X. This advertisement maps IP-X to MAC-X. All hosts that are on the same network as adapter X will receive the ARP advertisement.

FIG. 3 shows the steps executed by every host on the same network as X when the host receives the ARP advertisement from FIG. 2. Step 304 determines the IP address of the adapter over which the host received the advertisement. Step determines the IP address S of the new sending adapter X from the advertisement message. Step 307 determines if S is owned by this host. If the answer is no, then this host needs to update its ARP cache with the mapping contained in the advertisement. Thus, step 309 performs this by mapping IP-S from the advertisement with the MAC contained in the advertisement. If step 309 determines that S is owned by this host, then this host must determine if it received the advertisement over a adapter other than the one on which it was sent. If so, the receiving adapter is on the same network as the sending adapter X. Thus, step 308 determines if IP-R equals IP-S. If they are equal, the advertisement is ignored. If they are unequal, step 310 determines if the receiving adapter R has a backup adapter marked in the adapter control block. If it doesn't have a backup adapter, step 312 marks S as the backup adapter for R. Next, step 314 determines if S has a backup adapter. If not, then R is marked as the backup adapter for S at step 316. This ends the processing of an ARP advertisement. Every host receiving the advertisement has updated its ARP cache and the sending host has determined if adapters S and R can act as backup adapters for each other.

When an adapter X becomes inactive for any reason, then if X has a backup, all hosts must be told of backup. Also, if X is marked as backup for one or more another adapters in the host owning X, then the control blocks pertaining to the other adapters must be updated to remove X as backup. Step 402 of FIG. 4 determines if adapter X has a backup adapter Y. If so, then step 404 sends an ARP advertisement over adapter Y mapping IP-X to MAC-Y. Step 406 locates all adapter control blocks in the host owning X and clears the backup adapter field in any that has X marked as backup.

Sometimes a host sends an ARP request into a network to request the host owning an adapter X with IP address IP-X to reply with its MAC address MAC-X. FIG. 5 shows the steps executed by a host when it receives an ARP request associated with IP-A over adapter B. Step 502 determines if IP-A equals IP-B. That is, 502 determines if the request is received over the same adapter as the IP address contained in the request. If the answer is yes, step 506 returns a conventional ARP reply over the adapter mapping IP-A to MAC-A. If the answer is no, conventional hosts will not generate a reply. However, step 504 of the invention determines if a backup adapter B is marked in the A control block. If not, nothing more can be done. However, if A has a backup, step 505 determines if adapter A is active. If it is, then it is assumed that a reply will be made to the request that is received over adapter A. Thus, no further processing is done on this request. However, If adapter A is not active, then step 506 sends an ARP reply to the requester mapping IP-A to MAC-B.

FIG. 6 shows the steps executed by a host when it receives a reply to an ARP request. At step 602, the ARP cache maintained by the host receiving the reply conventionally updates its ARP cache to associate the IP address in the reply to the MAC address in the reply.

The Second Embodiment

The second embodiment relies principally on sending and receiving ICMP (Internet Control Message Protocol) messages with a hop count of one to determine which of separate networks contain specific adapters. This embodiment is also arranged to handle offload adapters and VIPAs.

FIG. 7 is the initial figure of the second embodiment and shows the steps executed by a host when an adapter X becomes active at the host. X should regain ownership of its IP address if another backup adapter has been previously given responsibility (IP-X associated with MAC Y). Step 702 determines if a backup adapter is specified in the adapter X control block. If the answer is yes, step 708 determines if the backup adapter is an offload adapter. If that answer is yes, at step 710 the host sends a command to the adapter X to un-register IP-X with MAC-Y. This causes the adapter X to remove any association of IP-X with MAC-Y. Step 704 clears the backup adapter field in the X control block so that no other adapter is marked as backup for X. Any possible backup adapter for X will be determined dynamically shortly. Step 706 determines if X is an offload adapter. If it is, step 712 sends a command to the adapter X to register IP-X with MAC-X. This causes the adapter to send an ARP advertisement into the network containing this association. If the adapter is not an offload adapter, step 714 sends the advertisement into the network itself. Next begins the operation of determining what adapters are on what network. Step 716 determines if this adapter X is the first adapter to become active on this host. If there are no other active adapters on this host, then this host knows of no other network other than the network on which X is located, so there is no need to determine the network to which X belongs relative to other active adapters. In this case, step 724 creates a new and first network control block for a network PNET-X (where X in this case is 1) and links the network control block to the adapter X control block. All that is known now is that adapter X is active and that it resides in some network designated as PNET-1. Since X is the only active adapter on this host, it is marked at step 726 as owning all virtual IP addresses adapters on this host for this physical network. An alternative when an adapter becomes active is to assign VIPA responsibility to any one of the adapters known to the host at that time. Step 728 determines if X is an offload adapter. If so, step 730 sends a message to adapter for each VIPA owned by the host. Each message maps IP-V with the adapter X. As a result, adapter X sends an ARP advertisement message into the network mapping each IP-V to its MAC address MAC-X. If the adapter is not an offload adapter, step 732 sends the ARP advertisements into the network itself.

Returning to step 716, if there are active adapters on this host other than X, then it is desired to determine on which, if any, of these networks X resides. For each physical network known to the host (as evidenced by network control blocks created by the host) step 718 selects one adapter and sends an ICMP message to that adapter via the new adapter X. The ICMP message is marked with a hop count of one to prevent routers and other hosts from transmitting the packet off of the physical network. In the preferred embodiment, the ICMP message used is an echo request, although any message with a hop count of one can be used. Also, step 718 saves the IP address of each selected destination adapter in a list. When all of the echo requests have been sent at step 718, step 720 starts a timer. The IP address of the new adapter X is included in the timer setup as a parameter to be delivered if a timeout occurs. That is the end of this processing. The network occupied by adapter X will be determined by a reply to the echo request or a timeout of the timer activated by step 720.

FIG. 8 shows the steps executed by a host if and when it receives an ICMP echo request. If a request is received over an adapter on the list from 718, then it is known that the adapter X over which the message was sent in the same network as the adapter receiving the message. Step 802 determines if this receiving host sent the ICMP echo request. If it did not, then the echo request offers no information as to what networks the adapters on this host belong. Therefore, the echo request is processed in the conventional way at step 808. If the echo request was sent by this receiving host, step 804 determines if this request contains an IP address that is on the list generated at step 718. If the answer is no, then again the echo request is just processed conventionally at step 808. If the IP address is on the list, it is now known that the adapter X, whose IP address is in the echo request, is in the same network as the receiving adapter. Step 806 sets the network field of the adapter X control block to point to the same network to which the receiving adapter points. Since an adapter can only be in one network, step 807 cancels the timer initiated at 718. Processing of the echo request is completed by step 808. It is now known which of the active adapters on this host has the capability of acting as backup for the new adapter. An actual backup adapter is not selected at this time. That decision is reserved in the preferred embodiment until it is necessary. This is discussed below with respect to FIG. 14.

FIG. 9 shows the steps executed by a host as a result of a timeout initiated at step 720. A timeout means that the newly active adapter X from FIG. 7 is not in any network presently known to the host. Therefore, the host needs to create a new network control block and link this adapter into it. The IP address of the new adapter X is delivered to step 900 when the timeout occurs. Step 902 determines if the adapter X control block is already linked to a network control block. If it is, then the timeout is ignored. If it is not, step 902 branches control at 904 to step 723 of FIG. 7 to create a new network identification PNET-X for this adapter and to link the adapter control block to the new PNET network control block.

FIG. 10 shows the steps executed by an offload adapter B when it receives an ARP request for the MAC address associated with an IP address IP-A. Step 1002 determines if the host has registered the address IP-A with the offload adapter. If the host has not so registered, the adapter ignores the ARP request. Otherwise, the adapter responds at step 1004 with an ARP reply mapping IP-A to MAC-B.

FIG. 11 shows the steps executed by a host when it receives an ARP request over adapter B for the MAC address associated with IP-A. Step 1102 compares IP-A with IP-B to determine if the request is received over the same adapter to which the request pertains. If so, then step 1106 replies to the ARP request in the conventional way mapping IP-A to MAC-A. If IP-A does not match IP-B, step 1104 determines if adapter B is marked as a backup for adapter A. If it is, then again step 1106 replies to the request, but in this case it maps IP-A to MAC-B. At 1104, if adapter B is not marked as backup for adapter A, step 1108 determines if IP-A is a VIPA address. If IP-A is a VIPA address, then step 1110 determines if adapter B is designated as owning responsibility for VIPAs for that physical network. If it is, then step 1106 replies to the ARP request, mapping MAC-B to the virtual IP address IP-A.

FIG. 12 shows the steps executed by a host it receives a reply to an ARP request for the MAC address associated with IP-A. Step 1202 updates the ARP cache of the host in a conventional way to map the MAC address in the reply to the IP address in the reply.

FIG. 13 shows the steps executed by a host when it receives an ARP advertisement. Step 1302 also updates the host ARP cache table in a conventional way.

FIG. 14 shows the steps executed by a host when an adapter X becomes inactive. Step 1402 determines if there is another adapter on this host that also is in the same network as adapter X. This is determined by examining the network control blocks that are linked to the adapter control blocks for adapters that share the same network. If there is no other sharing adapter, no further processing is necessary. If there is, ARP caches and backup indications maintained by this host and other hosts need to be updated. Step 1406 picks the sharing adapter$B or one of the sharing adapters B if there are more than one to backup adapter X and updates the backup field in the adapter X control accordingly. Step 1408 determines if adapter B is an offload adapter. If so, step 1410 registers IP-X with adapter B to cause the adapter to advertise to the network a mapping of IP-x to MAC-Y. Otherwise, the host performs the advertising at step 1416. Step 1412 determines if adapter X has been designated as owning responsibility for VIPAs. If not, then processing is complete. If yes, step 1418 marks the backup adapter B as now owning VIPA responsibility. Step 1420 now determines if adapter B is an offload adapter. If so, step 1422 registers IP-V with the backup adapter B for each VIPA known to the host. This causes adapter B to broadcast an ARP advertisement to the network for each of these VIPAs mapping it to MAC-B. If adapter B is not an offload adapter, at step 1424 the host sends these advertisement messages into the network to complete the processing required for this inactive adapter X.

Skilled artisans in the fields to which the invention pertains will recognize that numerous variations can be made to the embodiments disclosed herein and still remain within the sprit and scope of the invention.

We claim:

1. For use in a network of multiple computing hosts using the Internet Protocol (IP) and the Address Resolution Protocol (ARP), a method of processing ARP requests, comprising:

in response to the activation of an adapter X at a first host, determining what physical network contains the adapter X, in response to the inactivation of adapter X, determining if there is another adapter Y owned by the first host and in the same physical network N as adapter X, and if there is another adapter Y in network N, designating adapter Y as backup for adapter X for the purpose of processing network ARP requests.

2. The method of claim 1 further comprising in response to the activation of adapter X, broadcasting an ARP advertisement over adapter X to all hosts in the same network as adapter X, the advertisement mapping an IP address of adapter X to a Media Access Control (MAC) address of adapter X.

3. The method of claim 1 further comprising in response to the inactivation of adapter X, broadcasting a message on network N to other hosts in network N mapping an Internet Protocol (IP) address of adapter X to a Media Access Control (MAC) address of adapter Y.

4. The method of claim 1 or claim 3 wherein the determining of another adapter Y owned by the first host and in the same network N as adapter X further comprises a) in response to the activation of adapter X, broadcasting an IP packet with a hop count of one over adapter X to one adapter in each physical network known to the first host, b) activating a timer with a timeout interval sufficient to receive a return of all packets broadcast in the last step, c) if the packet broadcast in step a) returns to the first host over adapter Y, assigning the adapter X to the same network as adapter Y, d) if the timer of step b) times out without a return in step c) of a broadcast packet, assigning adapter X to a new network known to the first host.

5. For use in a network of multiple computing hosts using the Internet Protocol (IP) and the Address Resolution Protocol (ARP), apparatus for processing ARP requests, comprising:

means responsive to the activation of an adapter X at a first host for determining what physical network contains the adapter X, means responsive to the inactivation of adapter X for determining if there is another adapter Y owned by the first host and in the same physical network N as adapter X, and means responsive to the last means for designating adapter Y as backup for adapter X for the purpose of processing network ARP requests.

6. The apparatus of claim 5 further comprising means responsive to the activation of adapter X for broadcasting an ARP advertisement over adapter X to all hosts in the same network as adapter X, the advertisement mapping an IP address of adapter X to a Media Access Control (MAC) address of adapter X.

7. The apparatus of claim 5 further comprising means response to the inactivation of adapter X for broadcasting a message on network N to other hosts in network N mapping an Internet Protocol (IP) address of adapter X to a Media Access Control (MAC) address of adapter Y.

8. The apparatus of claim 5 or claim 7 wherein the means for determining of another adapter Y owned by the first host and in the same network N as adapter X further comprises a) means response to the activation of adapter X for broadcasting an IP packet with a hop count of one over adapter X to one adapter in each physical network known to the first host, b) means for activating a timer with a timeout interval sufficient to receive a return of all packets broadcast in the last step, c) means responsive to the return of the packet broadcast in step a) to the first host over adapter Y for assigning the adapter X to the same network as adapter Y, d) if the timer of step b) times out without a return in step c) of a broadcast packet, assigning adapter X to a new network known to the first host.

9. A program storage product containing computer instructions which when executed in a first computer host causes the first host to perform a method of processing Address Resolution Protocol (ARP) requests in an Internet Protocol (IP) network, the method comprising:

in response to the activation of an adapter X at a first host, determining what physical network contains the adapter X, in response to the inactivation of adapter X, determining if there is another adapter Y owned by the first host and in the same physical network N as adapter X, and if there is another adapter Y in network N, designating adapter Y as backup for adapter X for the purpose of processing network ARP requests.

10. The program storage product of claim 9 wherein the method further comprises in response to the activation of adapter X, broadcasting an ARP advertisement over adapter X to all hosts in the same network as adapter X, the advertisement mapping an IP address of adapter X to a Media Access Control (MAC) address of adapter X.

11. The program storage product of claim 9 wherein the method further comprises in response to the inactivation of adapter X, broadcasting a message on network N to other hosts in network N mapping an Internet Protocol (IP) address of adapter X to a Media Access Control (MAC) address of adapter Y.

12. The program storage product of claim 9 or claim 11 wherein the step of determining of another adapter Y owned by the first host and in the same network N as adapter X further comprises a) in response to the activation of adapter X, broadcasting an IP packet with a hop count of one over adapter X to one adapter in each physical network known to the first host, b) activating a timer with a timeout interval sufficient to receive a return of all packets broadcast in the last step, c) if the packet broadcast in step a) returns to the first host over adapter Y, assigning the adapter X to the same network as adapter Y, d) if the timer of step b) times out without a return in step c) of a broadcast packet, assigning adapter X to a new network known to the first host.

13. A carrier wave containing computer instructions which when executed in a first computer host causes the first host to perform a method of processing Address Resolution Protocol (ARP) requests in an Internet Protocol (IP) network, the method comprising:

in response to the activation of an adapter X at a first host, determining what physical network contains the adapter X, in response to the inactivation of adapter X, determining if there is another adapter Y owned by the first host and in the same physical network N as adapter X, and if there is another adapter Y in network N, designating adapter Y as backup for adapter X for the purpose of processing network ARP requests.

14. The carrier wave of claim 13 wherein the method further comprises in response to the activation of adapter X, broadcasting an ARP advertisement over adapter X to all hosts in the same network as adapter X, the advertisement mapping an IP address of adapter X to a Media Access Control (MAC) address of adapter X.

15. The carrier of claim 13 wherein the method further comprises in response to the inactivation of adapter X, broadcasting a message on network N to other hosts in network N mapping an Internet Protocol (IP) address of adapter X to a Media Access Control (MAC) address of adapter Y.

16. The carrier wave of claim 13 or claim 15 wherein the step of determining of another adapter Y owned by the first host and in the same network N as adapter X further comprises a) in response to the activation of adapter X, broadcasting an IP packet with a hop count of one over adapter X to one adapter in each physical network known to the first host, b) activating a timer with a timeout interval sufficient to receive a return of all packets broadcast in the last step, c) if the packet broadcast in step a) returns to the first host over adapter Y, assigning the adapter X to the same network as adapter Y, d) if the timer of step b) times out without a return in step c) of a broadcast packet, assigning adapter X to a new network known to the first host.

* * * * *